US011178660B2

(12) United States Patent
Alanen et al.

(10) Patent No.: US 11,178,660 B2
(45) Date of Patent: Nov. 16, 2021

(54) DETERMINING ACCESS SLOT FOR COMMUNICATIONS ON RADIO INTERFACE

(71) Applicant: Nokia Technologies Oy, Espoo (FI)

(72) Inventors: Olli Petteri Alanen, Vantaa (FI); Enrico Henrik Rantala, Berkeley, CA (US); Mika Ilka Tapani Kasslin, Espoo (FI); Janne Marin, Espoo (FI)

(73) Assignee: Nokia Technologies Oy, Espoo (FI)

( * ) Notice: Subject to any disclaimer, the term of this patent is extended or adjusted under 35 U.S.C. 154(b) by 35 days.

(21) Appl. No.: 16/480,295

(22) PCT Filed: Feb. 1, 2017

(86) PCT No.: PCT/US2017/015964
§ 371 (c)(1),
(2) Date: Jul. 23, 2019

(87) PCT Pub. No.: WO2018/143971
PCT Pub. Date: Aug. 9, 2018

(65) Prior Publication Data
US 2019/0349926 A1    Nov. 14, 2019

(51) Int. Cl.
*H04W 72/04*  (2009.01)
*H04W 28/26*  (2009.01)
(Continued)

(52) U.S. Cl.
CPC ....... *H04W 72/0446* (2013.01); *H04W 28/26* (2013.01); *H04W 52/0206* (2013.01); *H04W 88/10* (2013.01); *H04W 92/20* (2013.01)

(58) Field of Classification Search
CPC ...... H04L 27/0008; H04W 4/00; H04W 4/60; H04W 28/26; H04W 52/02;
(Continued)

(56) References Cited

U.S. PATENT DOCUMENTS 7,180,876 B1    2/2007 Henry et al.
9,525,540 B1 *  12/2016 Shellhammer ...... H04L 27/0008
(Continued)

FOREIGN PATENT DOCUMENTS

WO    2016/144384 A1    9/2016
WO    2018/111305 A1    6/2018

OTHER PUBLICATIONS

International Search Report and Written Opinion received for corresponding Patent Cooperation Treaty Application No. PCT/US2017/015964, dated Apr. 17, 2017, 13 pages.
(Continued)

*Primary Examiner* — Khoa Huynh
(74) *Attorney, Agent, or Firm* — Harrington & Smith (57) ABSTRACT

There is provided determining by an apparatus an access slot for communications on a first radio interface of a first and second radio interfaces. The first radio interface receives a first frame comprising at least one time related parameter for determining an access slot for communications on the first radio interface. After receiving the first frame, the apparatus is transitioned to a first operation mode, where the first radio interface radio interface is disabled. An access slot on the first radio interface may be determined based on the at least one time related parameter received before the first radio interface was disabled and based on the reception time of the frame on the second interface. In response to receiving a second frame on the second radio interface, the apparatus is transitioned to a second operational mode, where the first radio interface is enabled for transmission in the determined access slot.

16 Claims, 8 Drawing Sheets

(51) Int. Cl.
*H04W 52/02* (2009.01)
*H04W 88/10* (2009.01)
*H04W 92/20* (2009.01)

(58) Field of Classification Search
CPC ......... H04W 52/0206; H04W 52/0216; H04W 52/0229; H04W 72/0446; H04W 74/006; H04W 88/06; H04W 88/10; H04W 92/20; Y02D 30/70
See application file for complete search history.

(56) References Cited

U.S. PATENT DOCUMENTS

| | | | |
|---|---|---|---|
| 2009/0280802 | A1 | 11/2009 | Chin et al. |
| 2010/0208660 | A1* | 8/2010 | Ji .................... H04W 52/0225 370/328 |
| 2014/0370809 | A1 | 12/2014 | Jose et al. |
| 2015/0071211 | A1 | 3/2015 | Seok |
| 2015/0173015 | A1 | 6/2015 | Lee et al. |
| 2015/0334630 | A1 | 11/2015 | Mcternan et al. |
| 2016/0105829 | A1 | 4/2016 | Wentink |

OTHER PUBLICATIONS

Extended European Search Report received for corresponding European Patent Application No. 17894786.7, dated Sep. 16, 2020, 13 pages.
Ryu et al., "Overall MAC Procedure for WUR", LG Electronics, IEEE 802.11-16/1445r1, Nov. 7, 2016, pp. 1-10.
Kim et al., "Initial Negotiation for WUR", ETRI, IEEE 802.11-17/0070r0, Jan. 16, 2017, pp. 1-9.

* cited by examiner

302 — TRANSMITTING, BY AN APPARATUS, A PLURALITY OF FIRST FRAMES TO A PLURALITY OF APPARATUSES ON A FIRST RADIO INTERFACE, EACH OF SAID FIRST FRAMES COMPRISING AT LEAST ONE TIME RELATED PARAMETER FOR DETERMINING AN ACCESS SLOT FOR THE CORRESPONDING APPARATUS OF THE PLURALITY OF APPARATUSES FOR COMMUNICATIONS ON THE FIRST RADIO INTERFACE

304 — TRANSMITTING, BY THE APPARATUS, A SECOND FRAME ON A SECOND RADIO INTERFACE TO THE PLURALITY OF APPARATUSES IN A FIRST OPERATION MODE, WHEREIN IN THE FIRST OPERATION MODE FIRST RADIO INTERFACES OF THE PLURALITY OF APPARATUSES ARE DISABLED AND SECOND RADIO INTERFACES OF THE PLURALITY OF APPARATUSES ARE ENABLED, FOR TRANSITIONING THE PLURALITY OF APPARATUSES TO A SECOND OPERATION MODE, WHEREIN IN THE SECOND OPERATION MODE THE FIRST RADIO INTERFACES OF THE PLURALITY OF APPARATUSES ARE ENABLED

306 — RECEIVING, BY THE APPARATUS, IN RESPONSE TO TRANSMITTING THE SECOND FRAME, THIRD FRAMES FROM THE PLURALITY OF APPARATUSES ON THE FIRST RADIO INTERFACE, IN ACCESS SLOTS DETERMINED ON THE BASIS OF THE TIME RELATED PARAMETERS OF THE FIRST FRAMES AND A RECEPTION TIME OF THE SECOND FRAME

DETERMINING ACCESS SLOT FOR COMMUNICATIONS ON RADIO INTERFACE

RELATED APPLICATION

This application was originally filed as PCT Application No. PCT/US2017/015964, filed on Feb. 1, 2017.

FIELD

The present disclosure relates to determining an access slot for communications on a radio interface, particularly when there are more than one radio interface for communications.

BACKGROUND

Wireless networks employ various power-saving features to reduce power consumption in battery-operated devices such as mobile devices or other wireless devices. Wireless devices are increasingly having more than one radio for communications. When the radios are on, i.e. enabled, they are operating according to their respective wireless network specifications and utilizing power—saving features defined by the wireless network specifications.

In a wireless device, power can be saved by switching its radios off. If a radio is switched off, i.e. disabled, the wireless device cannot receive or transmit information via the radio. When the radio is switched back on, queued data can be communicated via the radio. However, if the radio is switched back on but there is no queued data, the radio increases power consumption of the wireless device. Even if the radio is switched on and there is queued data to be communicated via the radio, communications of the queued data can be delayed and/or slow, if there are in sufficient radio resources for the radio, whereby the on-time of the radio is inefficiently utilized for the communications of the queued data.

Radio resources are limited for communications in wireless networks. In a case, where a large number of wireless devices would need radio resources in a relatively short time, communications of some wireless devices could be delayed as the wireless devices have to wait for their turn to utilize the radio resources. A similar phenomenon is possible, when radio resources are reserved for large data transfers.

The following use case is an example where radio resources may be used inefficiently. A device may have at least two radios. One radio may be a main radio and another radio may be a wakeup radio, utilizing lower power. In a power saving state, the main radio may be turned off and the wakeup radio may be turned on. If the device receives a wakeup frame, in the power saving state, via the wakeup radio, the device may consider it as trigger to enable the main radio. After turning the main radio on, the device may transmit a frame via the main radio to another device. In case the same wakeup frame is used to wake up a plurality of devices, then collisions may occur when the plurality of devices try to transmit frames to the another device. In addition, power consumption may increase due to medium access delay caused by contention.

BRIEF DESCRIPTION

According to an aspect, there is provided the subject matter of the independent claims. Some embodiments are defined in the dependent claims.

EMBODIMENTS

In connection with an apparatus having more than one radio interfaces, one of the radio interfaces, i.e. a first radio interface, may receive a first frame comprising at least one time related parameter for determining an access slot for communications on the first radio interface. After receiving the first frame, the apparatus may be transition to an operation mode, i.e. a first operation mode, where the first radio interface radio interface is disabled. The apparatus may transition, in response to receiving a second frame on another radio interface, i.e. a second radio interface, to an operation mode, i.e. a second operation mode, where the first radio interface is enabled. An access slot on the first radio interface may be determined based on the at least one time related parameter received before the first radio interface was disabled and based on the reception time of the second frame on the second interface, whereby a third frame on the first radio interface may be transmitted in the determined access slot, when the apparatus is in the second operation mode. In this way the access slot in the second operation mode may be at least partially determined based on the at least one time related parameter received prior to transitioning to the first operation mode and at least partially determined based on the reception time of the second frame causing the transition to the second operation mode. Transition to the second operation mode may occur either immediately, after a specified delay, or before the access slot.

At least some embodiments may be applied to wireless networks according to IEEE 802.11 (Wi-Fi) technology. The IEEE 802.11 working group has introduced a power-save mode where a device may temporarily shut down its Wi-Fi interface to reduce the power consumption. IEEE 802.11 based wireless local area networks (WLANs) comprise peer-to-peer wireless networks, referred to as ad hoc networks, and infrastructure networks. A device apparatus capable of communications over a radio interface employing a WLAN technology comprises a station (STA). The STA can be either an access point (AP) or a non-access point (non-AP) STA.

An STA capable of communications in an IEEE 802.11 based WLAN may have a radio interface, referred to 802.11 interface, employing a radio access technology based on the IEEE 802.11 technology. In the peer-to-peer networks, STAs are connected by direct radio links. In infrastructure networks, (non-AP) STAs are connected by radio links to a central entity, an AP, providing a data delivery service to the STAs connected to the AP. Accordingly, it should be appreciated that an AP may be an STA capable of serving as AP, e.g. capable of providing a data delivery service to the connected STAs.

IEEE 802.11ah task group has discussed on a Restricted Access Window (RAW) that is a feature which may reduce contention and/or collisions. During a time period defined as RAW, only a subset of STAs may communicate and the remaining STAs are silent and may save power, e.g. go to sleep. Scheduling information of the RAW may be carried in beacons transmitted by APs. The scheduling information of the RAW may be defined by a RAW Parameters Set (RPS) Information Element (IE). In order for an STA to communicate during a RAW, an STA should monitor the beacons to know when the RAW is scheduled and whether the STA is scheduled in the RAW. If the STA is saving power, e.g. asleep, it cannot receive beacons and obtain the scheduling information for the RAW. If the STA wakes up too often from a power save mode, e.g. from sleep, to monitor for beacons, power saving achieved by sleep periods may be small. On the other hand if the STA wakes up too infrequently, sleep periods may be long and can cause significant delays to the communications and also scheduling the STA in RAWs may be aggravated.

Recent developments in IEEE 802.11 work groups have involved introduction of a new low-power radio interface called a wake-up radio (WUR). The WUR has been discussed in a WUR study group. A new task group, TGba, has been established and it will continue the work of the study group. One purpose of the new radio interface is to enable further power-savings to STAs by allowing a main radio (also known as a primary connectivity radio) interface used for data communication to sleep for longer periods. The main radio interface is expected to be WLAN radio interface. The low-power radio interface is called in the study group a WUR receiver or a low-power WUR (LP-WUR) receiver, and it is considered to be a companion radio to the primary connectivity radio. A wireless device such as the STA may comprise both a WUR interface and the main 802.11 interface. An access node, e.g. an AP, may comprise a wake-up transmitter and the main 802.11 interface. Accordingly, a device of the wireless network may include a WUR interface and the main interface.

According to an embodiment, a WUR interface may be designed such that it consumes less power than the main radio interface. The WUR interface may employ a simpler modulation scheme than the main radio interface, e.g. the WUR interface may use only e.g. on-off keying while the main radio interface uses variable modulations schemes such as phase-shift keying and (quadrature) amplitude modulation. The WUR interface may operate on a smaller bandwidth than the smallest operational bandwidth of the main radio interface, e.g. 5 Megahertz (MHz) for the WUR and 20 MHz for the smallest bandwidth of the main radio interface. The bandwidth values here are just examples, and WUR may utilize some other bandwidth, e.g. in range 1 MHz . . . 20 MHz.

Since the main purpose of the WUR interface is to wake up the main radio interface, the WUR interface may be powered on when the main radio interface is powered off. The WUR interface may be powered on all the time, or only when the main radio interface is powered off. A WUR interface of the STA may be configured to receive and extract WUR frames (WUFs) transmitted by a WUR interface of the access node. The WUR interface of the STA may be capable of decoding the WUFs on its own without any help from the main radio interface. Accordingly, the WUR interface may comprise, in addition to a radio frequency front-end receiver components, digital baseband receiver components and a frame extraction processor capable of decoding contents of a WUF. The WUF may comprise a destination address field indicating one or more STAs that should wake up the main radio interface, and the frame extraction processor may perform decoding of the destination address from a received WUF and determine whether or not the destination address is an address of the STA of the frame extraction processor. If yes, it may output a wake-up signal causing the main radio interface to wake up for radio communication with an access node.

In accordance with at least some embodiments described herein one or more access slots for a RAW following a sleep period of the 802.11 interface may at least partially be determined based on at least one time related parameter, which may be included in an RPS IE received prior to sleep period of the STA and at least partially determined based on the reception time of WUF.

Figure 1:
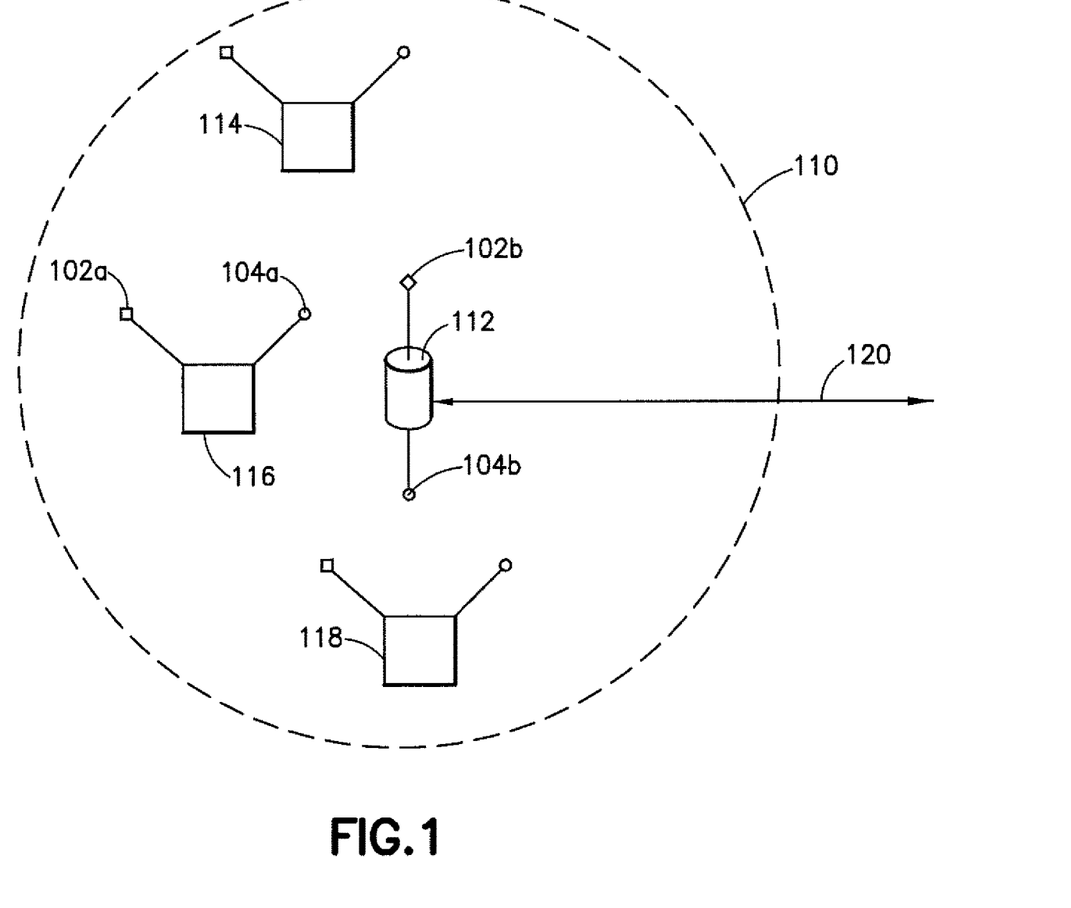
FIG. 1 illustrates an example of a wireless communication scenario in accordance with at least some embodiments of the present invention.

FIG. 1 illustrates an example of a wireless communications scenario in accordance with at least some embodiments of the present invention. The wireless communications scenario may comprise a plurality of wireless devices 112, 114, 116, 118 capable of communications with each other over at least two radio links. Wireless communications over a first radio link may be performed over a first radio interface 102a, 102b and wireless communications over the second radio interface may be performed over a second radio interface 104a, 104b. The wireless devices connected by the radio links may be capable of transmitting and/or receiving information, for example data and/or signalling, over one or both of the radio links, when the wireless devices are located within a coverage area 110, where radio signals from a transmitting wireless device may be received by a receiving wireless device. Examples of data communications comprise application layer data communications. Data in the application layer data communications may comprise application data, for example computer readable files, voice and/or video.

The wireless devices may form one or more wireless networks. Examples of the networks comprise peer-to-peer wireless networks and infrastructure networks. In a peer-to-peer wireless network, communications between the wireless devices is performed over direct radio links between the wireless devices. In an infrastructure network, communications is performed over a wireless link between a wireless device serving as central entity 112 and one or more other wireless devices. The wireless devices may access one or more services provided by the central entity over the radio links between the central entity and the wireless devices, whereby the central entity may be referred to an access node. The services of the central entity may comprise a data delivery service. The data delivery service may comprise switching and/or routing of data. The data delivery service may process data between the wireless devices communicating via the central entity. The central entity may be connected to an external system 120, for example another central entity or a core network node, whereby the data delivery service may process data between the wireless devices connected to the central entity over radio links and devices in the external system. Accordingly, the wireless devices within a coverage area of the central entity may access the data delivery service over the radio links, whereby the central entity may be referred to an access node.

Access slots may be time instants on a radio interface at which a wireless device may utilize the radio interface for communications over a radio link with one or more other wireless devices. An access slot may be defined by one or more time instants. One time instant may define a start time for a transmission on a radio interface. A further time instant may be used to define an end time, where the access slot ends and by which a transmission in the access slot should start on the air interface. The further time instant may be the end time or a duration from the start time to the end time. Wireless devices may follow an access control scheme for communications on the radio interface. The access control scheme may be utilized for determining whether a wireless device may obtain an access slot for communications on the radio interface. The access control schemes may be centralized or distributed. In the centralized access control scheme a central entity in a wireless network may perform scheduling of communications resources on the air interface. In the distributed access control scheme scheduling of communications is distributed between the communicating wireless devices. Examples of the centralized scheme comprise polling, e.g. PS-POLL in IEEE 802.11 WLAN, and scheduler functionality in eNB in LTE networks. Examples of the distributed scheme comprise a Clear Channel Assessment (CCA) for example carrier sensing such as Carrier Sense Multiple Access with Collision Avoidance (CSMA/CA) in the IEEE 802.11 WLAN.

In an embodiment, a first radio interface 102a, 102b employs a first radio access technology and a second radio interface 104a, 104b employs a second radio access technology that is different from the first radio access technology. Accordingly, a radio link over the first radio interface may employ the first radio access technology and a radio link over the second radio interface may employ the second radio access technology. The different radio access technologies provide that the radio interface and power-saving features of each radio interface may be utilized in communications.

In an embodiment, the first radio access technology may be based on a wireless local area network technology, and the second radio access technology is a wakeup radio (WUR) technology. The first radio technology may be according to IEEE 802.11 technology, ZigBee or Bluetooth LE, for example. The WUR technology may be a passive WUR technology or an active WUR technology. In the active WUR technology, a WUR is arranged with a power source, for example an internal power source in a device, whereby the WUR may be powered by the internal power source. In the passive WUR technology, a WUR may be arranged with harvesting means for harvesting energy from radio signals for powering the WUR. In an example an apparatus capable of communications over a radio interface employing a WUR technology comprises a passive Radio Frequency IDentification (RFID) tag or an active RFID tag. In an example an apparatus capable of communications over a radio interface employing a WLAN technology comprises an access point (AP) or a WLAN station (STA). It should be appreciated that an AP may be an STA capable of serving as AP, e.g. capable of providing a data delivery service to the connected STAs.

The wireless communications scenario may be applicable to communications systems employing more than one radio access technology in communications by wireless devices. The communications systems may be based on the IEEE 802.11 technology, WiMAX (Worldwide Interoperability for Microwave Access), GSM, IS-95, UMTS LTE (Long-term Evolution for Universal Mobile Telecommunication System), LTE-Advanced and a fifth generation cellular communication system (5G). One example of a suitable communications system is the 5G system, as mentioned above.

Figure 2:
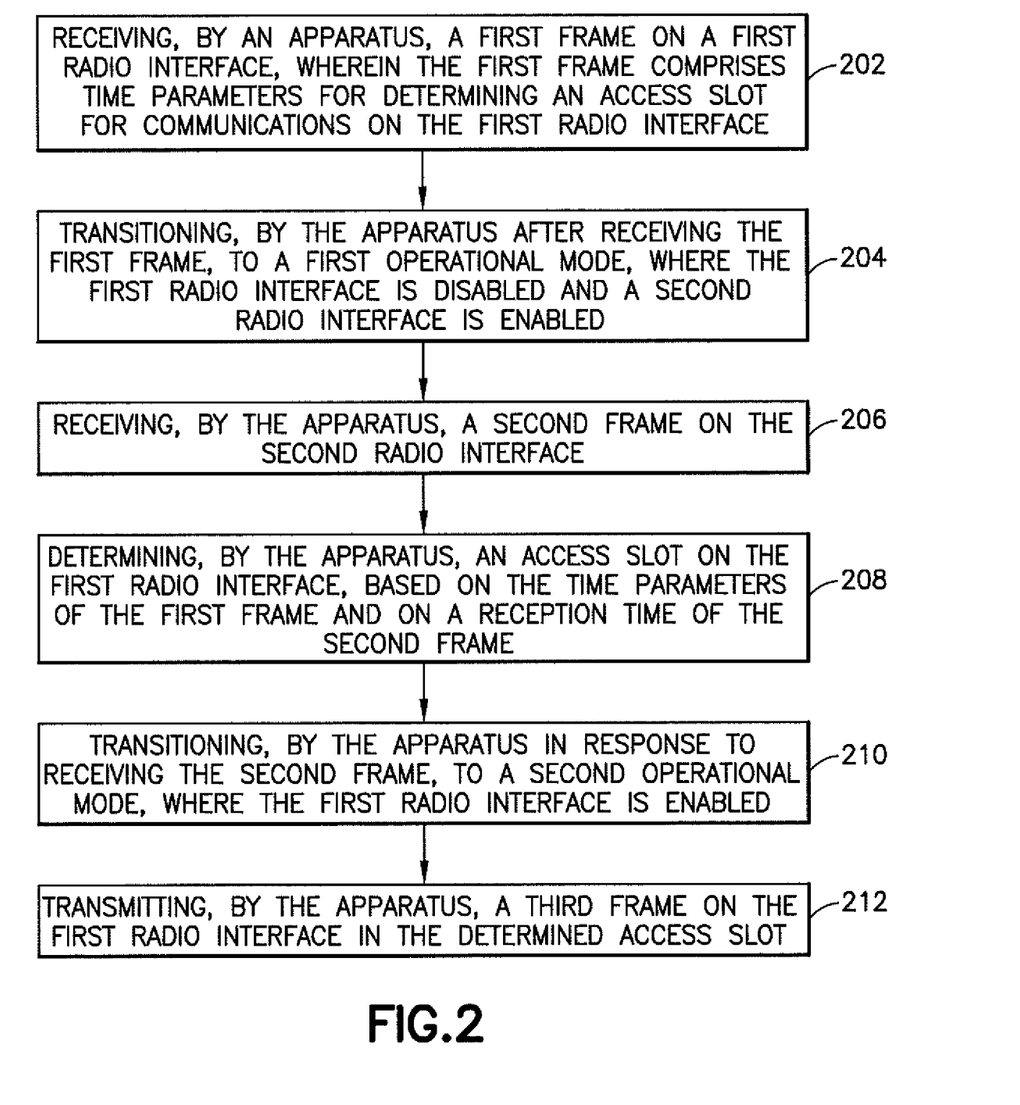
FIG. 2 is a flow graph of method in accordance with at least some embodiments of the present invention.

FIG. 2 is a flow graph of method in accordance with at least some embodiments of the present invention. The phases of the illustrated method may be performed in an apparatus, for example a wireless device 112, 114, 116, 118 of FIG. 1 or a control device configured to control the functioning of the wireless device, when implanted therein.

Phase 202 comprises receiving, by an apparatus for a wireless device, a first frame on a first radio interface, wherein the first frame comprises at least one time related parameter for determining an access slot for communications on the first radio interface. The first frame may be an association response frame from an access node of a wireless network. The first frame may be a response frame to a request by the apparatus to switch from one operation mode to another operation mode. The first frame may be another frame, received after association and before initiating switch to the another operation mode.

Phase 204 comprises transitioning, by the apparatus after receiving the first frame, to a first operation mode, where the first radio interface is disabled and a second radio interface is enabled.

Phase 206 comprises receiving, by the apparatus, a second frame on the second radio interface.

Phase 208 comprises determining, by the apparatus, an access slot on the first radio interface, based on the at least one time related parameter of the first frame and on a reception time of the second frame.

Phase 210 comprises transitioning, by the apparatus receiving the second frame, to a second operation mode, where the first radio interface is enabled. When the access slot is determined before transitioning to the second operation mode, the transition to the second operation mode may be scheduled on the basis of the access slot to be in time for utilizing the determined access slot. The transition may be delayed until a start time of the access lot or near the start time for saving power. In another embodiment, the transition may happen in response to receiving the second frame.

Phase 212 comprises transmitting, by the apparatus, a third frame on the first radio interface in the determined access slot.

In this way the third frame in the second operation mode may transmitted in an access slot that is at least partially determined based on the at least one time related parameter received prior to transitioning to the first operation mode and at least partially determined based on the reception time of the frame causing the transition to the second operation mode.

It should be appreciated that after the access slot has been utilized, the apparatus may transition back to the first operation mode or any other mode, where the where the first radio interface is disabled. However, the first operation mode may be preferred for receiving frames on the second radio interface in accordance with phase 206.

It should be appreciated that at least according to one embodiment, one or more phases of FIG. 2 may be optional.

It should be appreciated that at least according to one embodiment, one or more phases of FIG. 2 may be removed and/or performed in a different order.

It should be appreciated that the first radio interface and the second radio interface may be different radio interfaces. The different radio interfaces may employ different radio access technologies that may be utilized in a communications system described above.

In an embodiment phases of the method of FIG. 2 are performed in a wireless device for accessing a wireless network. An example of the wireless device may be an STA.

Figure 3:
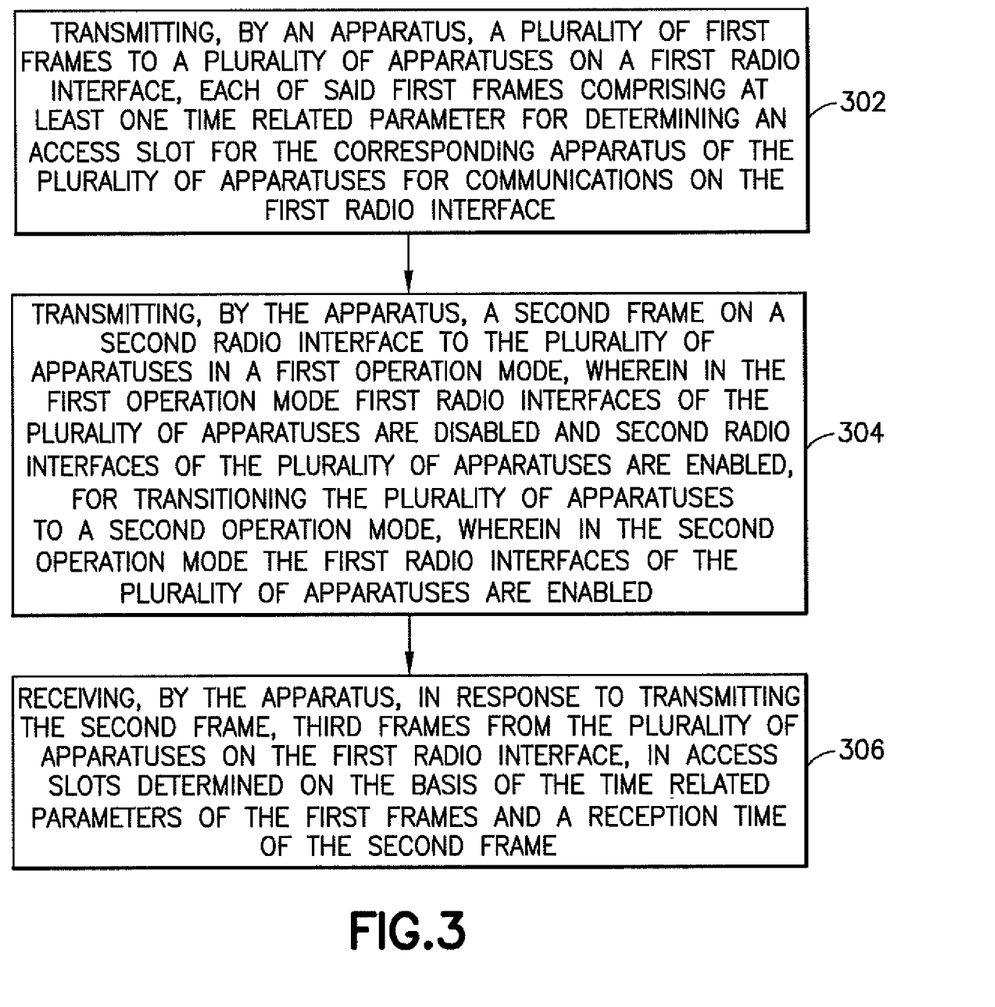
FIG. 3 is a flow graph of method in accordance with at least some embodiments of the present invention.

FIG. 3 is a flow graph of method in accordance with at least some embodiments of the present invention. The phases of the illustrated method may be performed in an apparatus, for example a wireless device 112, 114, 116, 118 of FIG. 1 or a control device configured to control the functioning of the wireless device, when implanted therein.

Phase 302 comprises transmitting, by an apparatus for an access node of a wireless network, a plurality of first frames to a plurality of apparatuses on a first radio interface, each of said first frames comprising at least one time related parameter for determining an access slot for the corresponding apparatus of the plurality of apparatuses for communications on the first radio interface.

In one example the plurality of first frames may be frames that are addressed to all apparatuses within the coverage area of the transmitting apparatus. On the other hand the plurality of first frames may be dedicated frames, e.g. response frames, to specific receiving apparatuses.

Phase 304 comprises transmitting, by the apparatus, a second frame on a second radio interface to the plurality of apparatuses in a first operation mode, wherein in the first operation mode first radio interfaces of the plurality of apparatuses are disabled and second radio interfaces of the plurality of apparatuses are enabled, for transitioning the plurality of apparatuses to a second operation mode, wherein in the second operation mode the first radio interfaces of the plurality of apparatuses are enabled.

Phase 306 comprises receiving, by the apparatus, in response to transmitting the second frame, third frames from the plurality of apparatuses on the first radio interface, in access slots determined on the basis of the time related parameters of the first frames and a transmission time of the second frame.

In this way the third frames in the second operation mode may be received in access slots that are at least partially determined based on the at least one time related parameter received prior to transitioning to the first operation modes and at least partially determined based on the transmission time of the frame causing the transition to the second operation modes.

It should be appreciated, that each of the plurality of apparatuses transmitting the third frames may determine an access slot for a third frame in accordance with phase 208 in FIG. 2.

In an embodiment phases of the method of FIG. 3 are performed in an access node of a wireless network. An example of the wireless device may be an AP.

It should be appreciated that at least according to one embodiment, one or more phases of FIG. 3 may be optional.

It should be appreciated that at least according to one embodiment, one or more phases of FIG. 3 may be removed and/or performed in a different order.

Figure 4:
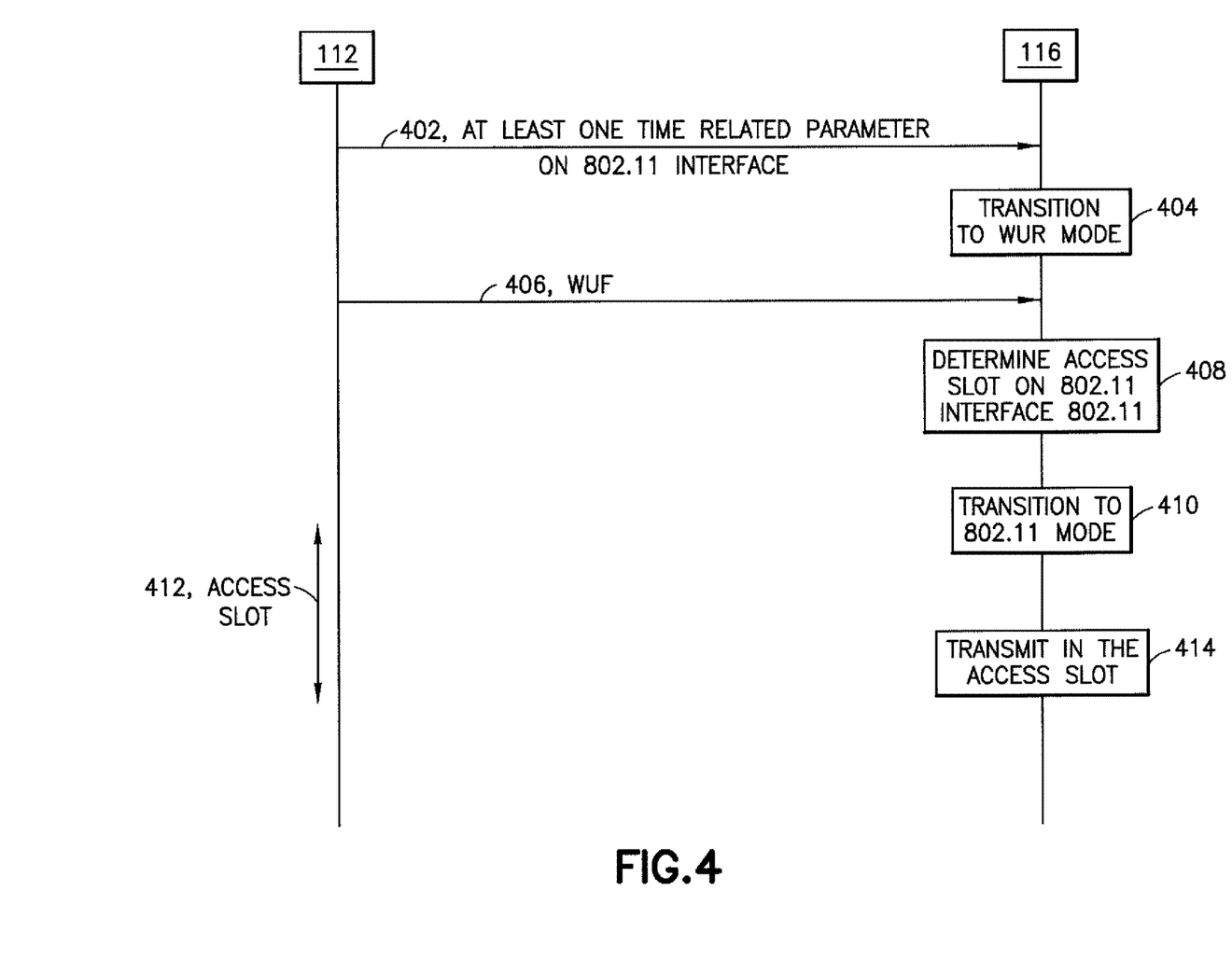
FIG. 4 illustrates a sequence in accordance with at least some embodiments of the present invention.

FIG. 4 illustrates a sequence in accordance with at least some embodiments of the present invention. The sequence illustrates functionalities performed by wireless devices 112, 116 connected by two radio links over radio interfaces 102a, 102b, 104a, 104b illustrated in FIG. 1. It should be appreciated that the functionalities may be performed also by control devices configured to control the functioning of the wireless device, when implanted therein.

In the following embodiments are described in the context of the radio interfaces based on WLAN technology and WUR technology. In this context, the first radio interface employs a radio access technology based on the IEEE 802.11 and is referred to as 802.11 interface, and the second radio interface employs a radio access technology based on the WUR technology and is referred to as WUR interface. In this context, the first operation mode is referred to as WUR mode, the second operation mode is referred to as 802.11 mode and the second frame is a WUF. It should be appreciated that the context is presented for the purpose of clarity and the embodiments may be applied also to other radio access technologies such as the radio access technologies.

Referring to FIG. 4, the wireless device 116 may an STA and the wireless device 112 may be an AP. The sequence illustrates functionalities associated with determining an access slot for communications in connection with the STA transitioning into WUR mode and 802.11 mode. Initially, the STA and the AP may be in an operation mode capable of communications of data over one or more radio interfaces including the 802.11 interface and/or a radio interface according to another radio interface technology. Accordingly, an initial operation mode of the STA and the AP may be an operation mode, where at least one radio interface is enabled, i.e. on, for communications data. In an example, in the initial operation mode, the 802.11 interface may be enabled. In the initial operation mode, the WUR interface of the STA may be enabled or disabled. It should be appreciated that the sequence illustrates communications between the AP and one STA, however the AP may be connected to one or more other STAs and the sequence may be applied to the communications with the other STAs. Indeed, it should be appreciated that particularly transmissions, e.g. beacons, from the AP may be receivable to many STAs within its coverage area, whereby a single transmission from the AP may be received by many STAs.

In phase 402, at least one time related parameter may be transmitted from the AP to the STA e.g. in a Restricted Access Window (RAW) Parameter Set (RPS) IE or other IE included in a frame from the AP to the STA, in accordance with at least one of phase 202 of FIG. 2 and phase 302 of FIG. 3.

In phase 404, after receiving the at least one time related parameter, the STA may transition to a WUR mode, in accordance with phase 204 of FIG. 2. In the WUR mode, the 802.11 interface is disabled and a WUR interface is enabled. In the WUR mode, the power consumption of the STA is preferably smaller than if the 802.11 interface was enabled, whereby power may be saved by the STA.

In phase 406, the AP transmits a WUF on the WUR interface to the STA, for transitioning the STA to the 802.11 mode, in accordance with phase 304 of FIG. 3. In the 802.11 mode the 802.11 interface is enabled. The WUF may be transmitted by the AP for example, if the AP determines that there is data to be delivered the STA, where by the 802.11 interface should be enabled.

In phase 408, an access slot 412 on the 802.11 interface is determined, based on the received at least one time related parameter and on a reception time of the second frame, in accordance with phase 208 of FIG. 2. The WUF may comprise a destination address field indicating the STA, whereby the STA may determine that it is assigned an access slot on the 802.11 interface.

In an embodiment, an AP may assign an access slot to STA on the basis of a delay constraint of the STA related to transitioning of the STA from the WUR mode to the 802.11 mode. The delay constraint may be referred to a wake-up delay. When the wake-up delay is small the AP may assign an STA an access slot that follows very early after the AP has transmitted a WUF. On the other hand when the wake-up delay is large the AP may assign an STA an access slot that follows after one or more access slots assigned to STAs having a smaller wake-up delay. The access slots may be assigned in a RAW, where one or more access slots assigned to STAs having a small wake-up delay are assigned first in the RAW before one or more access slots of STAs having a large wake-up delay. Access slots may be assigned according to any of the approaches explained in FIGS. 5, 6 and 7, for example.

In phase 410, in response to receiving the WUF, the STA is transitioned to the 802.11 mode, in accordance with phase 210 of FIG. 2.

In phase 414, the STA utilizes the determined access slot 412 and transmits one or more data frames and/or control frames and/or management frames on the 802.11 interface, in accordance with at least one of phase 214 of FIG. 2 and phase 306 of FIG. 3. The access slot may be an access slot in a RAW. The RAW may include one or more access slots assigned to STAs associated to the AP. During the RAW, only the STAs that are assigned an access slot in the RAW can engage in communications with the AP.

In an embodiment, in phase 402, the transmitted frame comprising the at least one time related parameter is an association response frame from the AP, or the frame is a response frame to a request by the STA to switch from a current operation mode of the STA to the WUR operation mode. The current operation mode may be the initial operation mode of the STA, for example the 802.11 mode. An association response frame may be received as response to an association request frame transmitted from the STA to the AP. The association response frame may serve for confirming association of the apparatus to the AP. Using the association response frame to carry the at least one time related parameter provides that time related parameters may be provided to the STA right after when the STA is associated with the AP. A request to switch to the WUR mode from a STA to an AP may cause the response frame as response to the request. Using the response frame to the request to switch to the WUR mode to carry time related parameters provides that time related parameters may be provided only, when the transition to the WUR mode is topical to the STA.

In an embodiment, in phase 402, the transmitted frame comprising the at least one time related parameter causes reservation of the access slot 412 on the 802.11 interface, said access slot comprising an access slot positioned after the transmission of the WUF on the WUR interface in phase 406. The WUF may be considered transmitted at a reception time of the WUF. Time related parameters carried in the first frame may be stored for later use in the determining the access slot, when the apparatus transitions to the 802.11 mode. Without the time related parameters the access slot may not be reserved to the STA and the access slot may be free or reserved to another STA.

In an embodiment, in phase 402, the transmitted frame comprising the at least one time related parameter may include information indicating assignment of the access slot to the STA. In this way the STA is informed of the access slot assigned to the STA. Moreover, other STAs receiving the information indicating assignment of the access slot may determine that the access slot is reserved and avoid transmissions in that access slot. The timing of the access slot may be determined at least based on the reception time of the WUF. In an example, the access slot is an access slot in a RAW, whereby only STAs that are assigned an access slot in the RAW may engage in communications with the AP during the RAW.

In an embodiment, in phase 402, the transmitted frame may include information indicating assignment of the access slots to a plurality of STAs. In this way STAs associated to the AP and within its coverage area may obtain information regarding access slots assignments in a single frame.

In an example the information indicating assignment may comprise information identifying the STA and the access slots reserved to the STA. The information identifying the STA and the access slots reserved to the STA may be included in a RAW Assignments field in the RPS IE.

In an embodiment, in phase 406, the WUF may be a multicast WUF or a broadcast WUF capable of triggering determination of access slots assigned to the plurality of apparatuses. The broadcast WUF may comprise a broadcast address as receiver address of the broadcast WUF. The multicast WUF may comprise a multicast address as receiver address of the multicast WUF. The broadcast WUF provides that more than one STA may be intended receivers and caused to transition to the 802.11 mode, whereby the single WUF may be sufficient to reach all the devices within a coverage area of the frame transmission. The addressed devices may be limited to a group of devices, when the WUF is a multicast WUF. Accordingly, the multicast WUF provides that only a part of STAs in the WUR mode may be addressed and caused to transition to the 802.11 mode.

FIGS. 5 to 8 illustrate communications scenarios on radio interfaces in accordance with at least some embodiments of the present invention. The communications may be performed by STAs 112, 114, 116, 118 connected by two radio links over radio interfaces 102*a*, 102*b*, 104*a*, 104*b* illustrated in FIG. 1. It should be appreciated that the functionalities may be performed also by control devices configured to control the functioning of the STA, when implanted therein.

Figure 5:
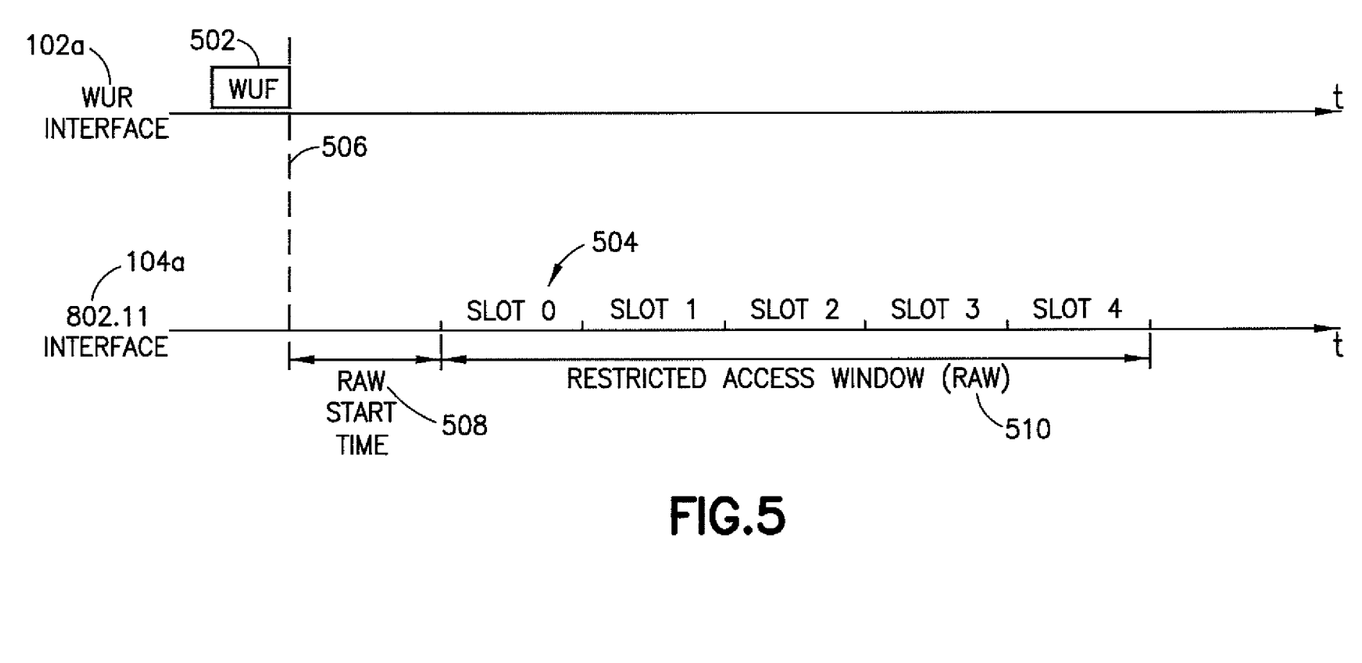
FIGS. 5 to 8 illustrate communications scenarios on radio interfaces in accordance with at least some embodiments of the present invention.
Figure 6:
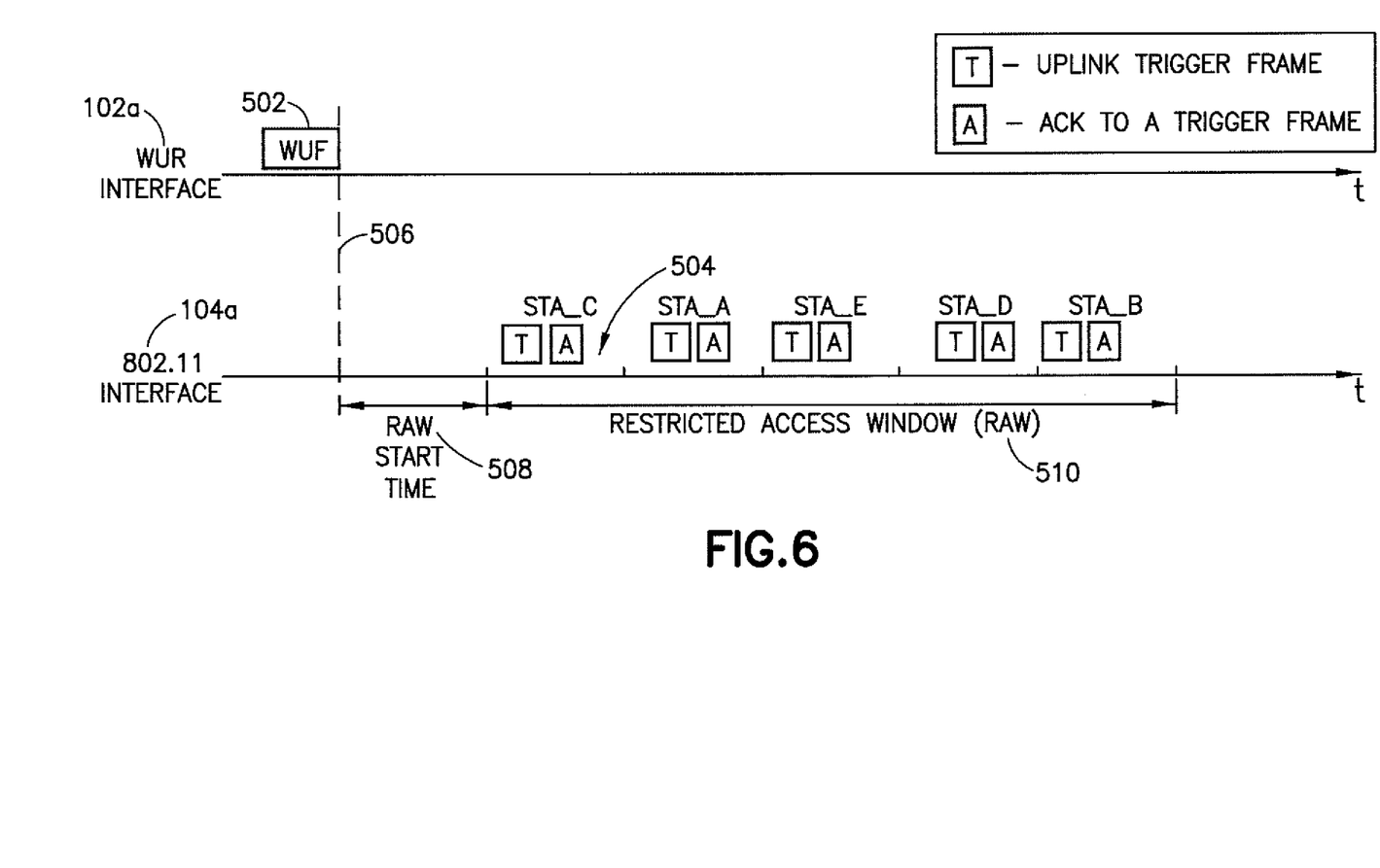

FIGS. 5 and 6 the illustrate communications scenarios, where access slots are assigned to STAs without transmission of information regarding the assignments on the 802.11 interface after reception time 506 of the WUF 502. The access slots may be assigned to the STAs prior to entering the WUR mode in an RPS IE accordance with phase 402 in FIG. 4. Initially, at least one STA may be in a WUR mode after phase 404 in FIG. 4. The access slots may be assigned in a RAW, whereby only STAs that are assigned an access slots in the RAW 510 may engage in communications with the AP during the RAW. The communications may be uplink communications, i.e. a transmission from the STA to the AP, and/or downlink communications, i.e. a transmission from the AP to the STA. The communications may comprise data and/or signaling.

When the STA is in the WUR mode, a WUF frame 502 may be received on the WUR interface 102*a* from an AP. One or more access slots 504 on the 802.11 interface may be determined in accordance with at least one of phase 208 in FIG. 2 and phase 408 in FIG. 4. The access slots may be positioned after an intermediate time period 508 after the reception time of the WUF. The intermediate time period may be referred to as RAW start time, RAW offset time or time before RAW, for example. The RAW start time may be based on a duration of a time slot on the 802.11 interface.

FIG. 5 illustrates a communications scenario in a generic approach for assigning access slots to STAs for uplink and/or downlink data communications. In the generic approach, the STAs may be assigned the access slots without necessarily communicating any information regarding assignment of the access slots on the 802.11 interface after reception of the WUF 502, whereby the time the STAs spend in the 802.11 mode is not prolonged by communications of management information on the 802.11 interface before the access slots 504.

FIG. 6 illustrates a communications scenario in a triggering frame approach for assigning access slots to STAs. The triggering frame approach may be according to the generic approach above. Additionally, the triggering frame approach may define communications within an access slot such that scenarios may be supported, where no uplink data is expected from the STAs to the AP on the 802.11 interface. Similar to the generic approach, in the triggering frame approach, the STAs may be assigned access slots without necessarily communicating any information regarding assignment of the access slots on the 802.11 interface after reception of the WUF. In the triggering frame approach, the STA may be caused to transmit in the access slot 504 assigned to the STA an uplink frame, i.e. uplink trigger frame 'T'. The uplink trigger frame is preferably short control frame capable of serving as an acknowledgement for the WUF. Accordingly, the trigger frame may be without any user data payload. The uplink trigger frame may provide at least that the AP may obtain information from the STA that the IEEE 802.11 interface of the STA is switched on. In one example the uplink trigger frame may be a QoS Null frame. The AP may respond to the trigger frame by an acknowledgement 'A'. Alternatively or additionally the triggering frame approach may provide that the WUF may serve for polling the STAs, whereby the AP may obtain information regarding which STAs are within its coverage area without communications of user data. It should be appreciated that the access slots assigned for the triggering frame approach may be kept short since the frames do not carry user data payload, whereby the time the STAs spend in the 802.11 mode may be short as well.

Figure 7:
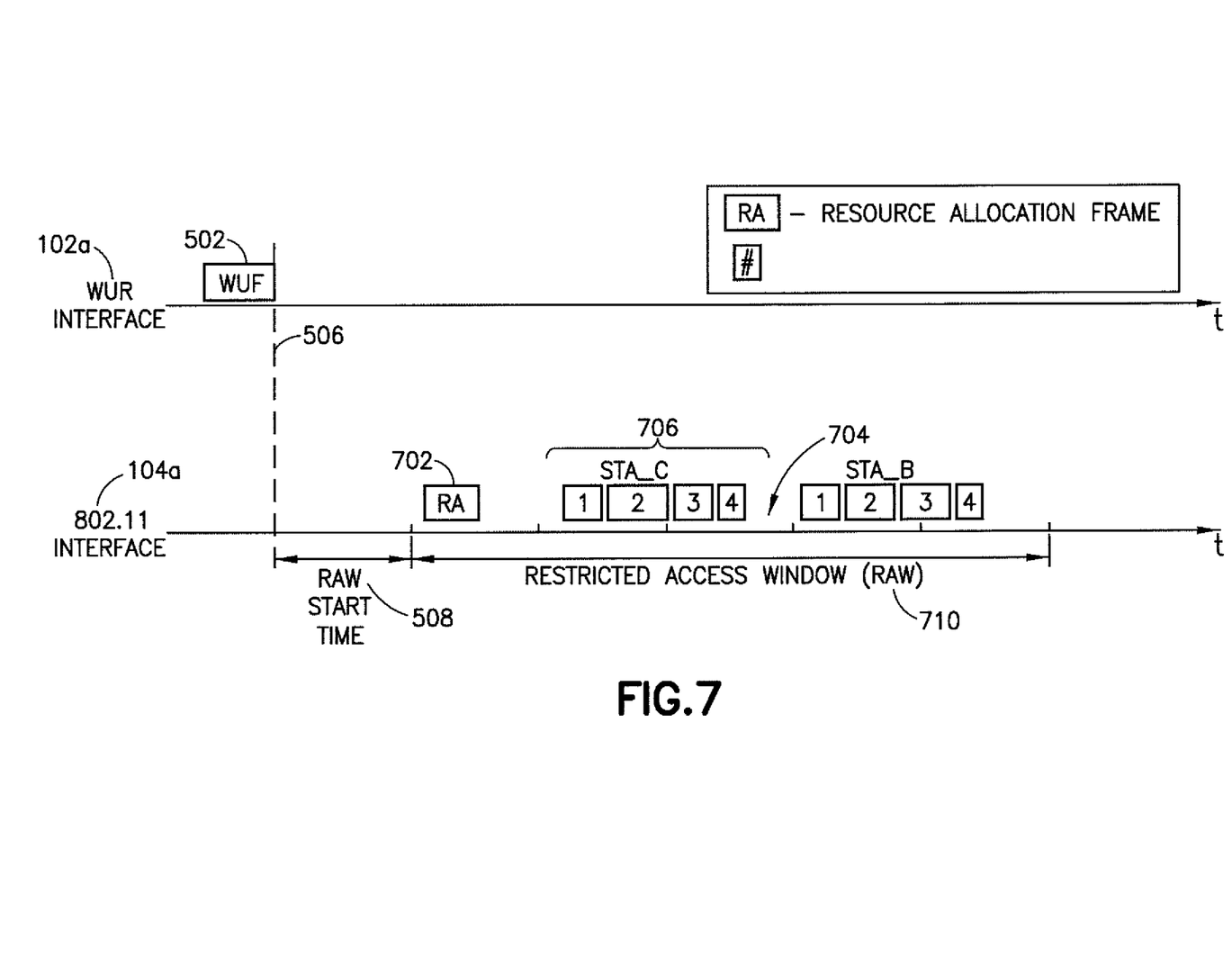

FIG. 7 illustrates a communications scenario in an adaptive approach for assigning access slots to the STAs. Similar to FIGS. 5 and 6, initially at least one STA may be in a WUR mode after phase 404 in FIG. 4. The access slots may be assigned in a RAW 710 after a RAW start time 508 and reception of the WUF 502. Only STAs that are assigned an access slots in the RAW 710 may engage in communications with the AP during the RAW. In the adaptive approach, at least part of the information 702 for determining an access slot 704 for the STA is transmitted on the 802.11 interface after reception of the WUF. However, it is viable that substantially all information for determining access slot is transmitted on the 802.11 interface after reception of the WUF. In one example information indicating at least a type of a RAW following a WUF may be communicated before the transition of the STA into a WUR mode. In an example the type of the RAW may be included in a RAW Type Options in RAW Control subfield of the RPS IE. In one example, the information 702 for determining an access slot 704 for the STA transmitted on the 802.11 interface after reception of the WUF may comprise a Resource Allocation (RA) frame. The adaptive approach provides that assignments of access slots on the 802.11 interface after reception time of the WUF may be adapted only a very short time period before the access slots. In an example, the assignments of access slots may be adapted on the basis of changes in a group of STAs addressed in the WUF and/or data communications directions of the access slots. The data communications direction of an access slot assigned to an STA may be at least on of an uplink direction and downlink direction. The adaptive approach may be particularly preferred, when the data communications directions of the STAs are different. Accordingly, for one or more STAs data may be queued in the AP for downlink delivery to the STAs, whereby these STAs may be assigned access slots for downlink data communications. On the other hand, for one or more STAs there may be no data queued for downlink data communications, whereby these STAs may be assigned access slots for uplink data communications.

It should be appreciated that a STA may be assigned one or more access slots 704. Referring to FIG. 7, STAs STA_C and STA_B are both assigned two access slots. When more than one access slots are assigned per STA, the time available, referred to as a transmission opportunity (TXOP) 706, for data communications of the STA is increased. During the TXOP, the STA and the AP may communicate one or more frames on the radio interface across access slot boundaries as long as the communications does not exceed beyond the last access slot in the TXOP.

It should be appreciated that a TXOP assigned to a STA may be defined for an uplink data transmission and/or a downlink data transmission. Following, the illustration of FIG. 7, the STA_C and STA_B may both have bi-directional TXOPs, where both uplink data frames 1, 3 and downlink data frames 2, 4 are communicated.

It should be appreciated that an STA may obtain information indicating an approach for example, one of the approaches illustrated in FIGS. 5 to 7, to be applied in assigning access slots. The information indicating the approach may be obtained in an RPS IE received in an association response or in a response to a request by the STA to transition into WUR mode. The RPS IE may comprise RAW Type in RAW Control Subfield for indicating a type of the RAW 710.

In an example, the RAW Type may comprise two bits, which may be utilized in determining the approach to be applied in assigning access slots. When the bit at position 0 is set '0', it may be determined that the generic approach may be followed. When the bit at position 1 is set '1', it may be determined that the triggering frame approach is followed. When the bit at position 0 is set '0' and the bit at position 1 is set '0', it may be determined that the generic approach is followed, where all the information for determining the access slots are includes in an RPS IE transmitted by the AP before STAs transition into WUR modes.

Figure 8:
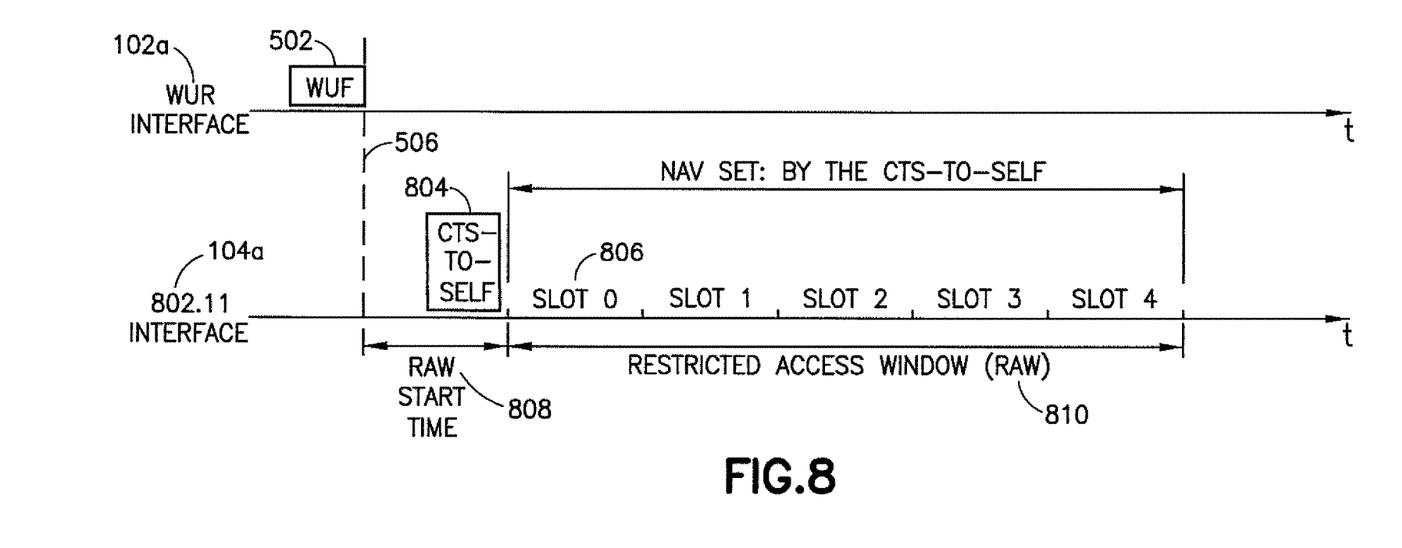

FIG. 8 illustrates a communications scenario for protecting access slots in accordance with at least some embodiments. Similar to FIGS. 5, 6 and 7, initially at least one STA may be in a WUR mode after phase 404 in FIG. 4. The access slots may be assigned in a RAW 810 after a RAW start time 808 and reception of the WUF 502. Only STAs that are assigned an access slots in the RAW 810 may engage in communications with an AP during the RAW. After the WUF 502, the AP may transmit information 804 indicating reservation of the access slots 806 on an 802.11 interface. Preferably, the access slots may be positioned after an intermediate time period, RAW start time, after the WUF and before the access slots. During this the RAW Start Time, the STAs that have received the WUF and are addressed in the WUF may be transitioned from the WUR mode to the 802.11 mode. However, one or more STAs that are not transitioning during the RAW Start Time and have their 802.11 interfaces enabled may receive information communicated on the 802.11 interface during the RAW start time. Such STAs may comprise for example devices that do not support WUR mode and RAW after WUR mode. The devices that do not support WUR mode and RAW after WUR mode may not defer from communications during the access slots in the RAW, whereby they present a potential source of interference to the STAs that have access slots in the RAW. Therefore, the information 804 indicating reservation of the access slots 806 may be preferred to be transmitted during the RAW start time after the WUF such that devices that are not compliant with the WUR mode and the RAW after WUR may be prevented from transmitting during the RAW.

The information 804 indicating reservation of the access slots 806 may be a frame that indicates to other STAs, than the STAs that have assigned slots in the RAW, that they are not permitted to transmit for a specific time period. The specific time period indicated reserved may include one or more access slots in a RAW. In one example the frame may comprise a Clear-to-Send (CTS) frame directed to the AP itself, i.e. CTS-to-self. A STA receiving the information indicating reservation of the access slots 806 may determine that it is not permitted to transmit for the specific time period indicated reserved by the CTS-to-self, unless the STA is among the STAs that are assigned an access slot in the RAW. A STA that is assigned an access slot in a RAW may transition from WUR mode into the 802.11 mode for receiving the information indicating reservation of the access slots. Such STA may utilize the assigned access slots despite the received information indicating reservation of the access slots. The CTS-to-self may be particularly advantageous, when CCA, for example the CSMA/CA in the IEEE 802.11 WLAN, is employed as channel access control scheme.

It should be appreciated that an STA may have a monitoring functionality for determining a transmission time on the 802.11 interface. The monitoring functionality may be capable of performing a CCA for determining whether the 802.11 interface is busy. The monitoring functionality may maintain information indicating one or more time periods, where the STA is not permitted to transmit on the 802.11 interface. The time periods may be maintained in a Network Allocation Vector (NAV). The reception of the CTS-to-self may cause updating the NAV with the specific time period indicated reserved by the CTS-to-self. In this way other STAs regardless of whether they support the different various approaches described herein for assigning access slots, may be caused to defer from transmissions during the access slots following the WUR.

Figure 9:
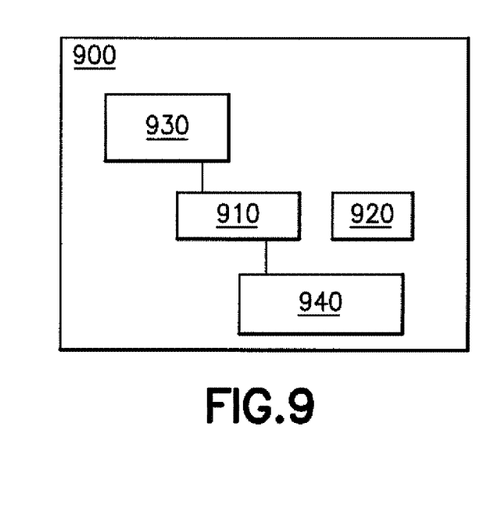
FIG. 9 illustrates an example apparatus capable of supporting at least some embodiments of the present invention.

FIG. 9 illustrates an example apparatus capable of supporting at least some embodiments of the present invention. Illustrated is device 900, which may comprise, for example, device 112, 114, 116, 118 of FIG. 1. Comprised in device 900 is processor 910, which may comprise, for example, a single- or multi-core processor wherein a single-core processor comprises one processing core and a multi-core processor comprises more than one processing core. Processor 910 may comprise more than one processor. A processing core may comprise, for example, a Cortex-A8 processing core manufactured by ARM Holdings or a Steamroller processing core produced by Advanced Micro Devices Corporation. Processor 910 may comprise at least one Qualcomm Snapdragon and/or Intel Atom processor. Processor 910 may comprise at least one application-specific integrated circuit, ASIC. Processor 910 may comprise at least one field-programmable gate array, FPGA. Processor 910 may be means for performing method steps in device 900. Processor 910 may be configured, at least in part by computer instructions, to perform actions.

Device 900 may comprise memory 920. Memory 920 may comprise random-access memory and/or permanent memory. Memory 920 may comprise at least one RAM chip. Memory 920 may comprise solid-state, magnetic, optical and/or holographic memory, for example. Memory 920 may be at least in part accessible to processor 910. Memory 920 may be at least in part comprised in processor 910. Memory 920 may be means for storing information. Memory 920 may comprise computer instructions that processor 910 is configured to execute. When computer instructions configured to cause processor 910 to perform certain actions are stored in memory 920, and device 900 overall is configured to run under the direction of processor 910 using computer instructions from memory 920, processor 910 and/or its at least one processing core may be considered to be configured to perform said certain actions. Memory 920 may be at least in part comprised in processor 910. Memory 920 may be at least in part external to device 900 but accessible to device 900.

Device 900 may comprise a first radio interface 930 and a second radio interface 940. A radio interface may comprise a transmitter and/or a receiver. The first radio interface may comprise a main radio of the device and the second radio may comprise a WUR. In one example, the main radio may comprise both a transmitter and a receiver and the WUR may comprise a receiver.

At least the main radio is capable of being enabled, i.e. switched on, and disabled, i.e. switched off or to sleep. The WUR may be connected to the main radio such that one or more frames or otter transmissions received by the WUR may cause enabling the main radio.

It should be appreciated that the WUR may also be enabled and disabled similar to the main radio. However, the WUR should be enabled, when the main radio is disabled for enabling the main radio through transmissions received by the WUR.

The first radio interface may be configured to operate in accordance with IEEE 802.11 technology, WiMAX (Worldwide Interoperability for Microwave Access), GSM, IS-95, UMTS LTE (Long-term Evolution for Universal Mobile Telecommunication System), LTE-Advanced or a fifth generation cellular communication system (5G).

It should be appreciated that the device 900 may comprise one or more further interfaces in addition to the main radio and the WUR. The further interfaces may comprise radio interfaces and/or wired interfaces. The radio interfaces may be configured to operate in accordance with a technology of which examples are defined above. Examples of the wired interfaces comprise an Ethernet interface or an optical communications interface.

The processor, the main radio, the WUR and the memory may be connected via electrical leads. The electrical lead may comprise a serial us or a parallel bus for example. Connections between the devices provide transmission of data and/or commands between the devices for execution of one or more functionalities described herein.

However, it should be appreciated that the processor 910, memory 920, main radio 930 and WUR 940 may be interconnected by electrical leads internal to device 900 in a multitude of different ways. For example, each of the aforementioned devices may be separately connected to a master bus internal to device 900, to allow for the devices to exchange information. However, as the skilled person will appreciate, this is only one example and depending on the embodiment various ways of interconnecting at least two of the aforementioned devices may be selected without departing from the scope of the present invention.

It should be appreciated that FIG. 9 illustrates an embodiment of a structure of the apparatus 900 capable of executing the above-mentioned functionalities of the process of FIG. 2, FIG. 3 or any one of the embodiments described above. The apparatus may be a wireless device 112, 114, 116, 118, for example an STA or an AP. The apparatus may comply with specifications of an IEEE 802.11 network and/or another wireless network. The apparatus may be defined as a cognitive radio apparatus capable of adapting its operation to a changing radio environment, e.g. to changes in parameters of another system on the same frequency band. The apparatus may be or may be comprised in a computer (PC), a laptop, a tablet computer, a cellular phone, a palm computer, or any other apparatus provided with radio communication capability. In another embodiment, the apparatus carrying out the above-described functionalities is comprised in such a device, e.g. the apparatus may comprise a circuitry, e.g. a chip, a chipset, a processor, a micro controller, or a combination of such circuitries in any one of the above-described devices. The apparatus may be an electronic device comprising electronic circuitries for realizing the embodiments of the present invention.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

ACRONYMS LIST

5G Fifth generation cellular communication system
AP Access Point
ASIC Application-Specific Integrated Circuit
CCA Clear Channel Assessment
CSMA/CA Carrier Sense Multiple Access with Collision Avoidance
CTS Clear-to-Send
eNB evolved NodeB
FPGA Field-Programmable Gate Array
GSM Global System for Mobile Telecommunications
IE Information Element
LP Low-Power
MHz Megahertz
NAV Network Allocation Vector
PC Computer
PS-POLL Power Save Poll
QoS Quality-of-Service
RA Resource Allocation
RAM Random Access Memory
RAW Restricted Access Window
RFID Radio Frequency Identification
RPS RAW Parameters Set
STA Station
TXOP Transmission Opportunity
UMTS LTE Long-term Evolution for Universal Mobile Telecommunication System
WiMAX Worldwide Interoperability for Microwave Access
WLAN Wireless Local Area Network
WUF WUR Frame
WUR Wake-Up Radio

| REFERENCE SIGNS LIST | |
|---|---|
| 102a, 102b | First radio interface, e.g. main radio |
| 104a, 104b | Second radio interface, e.g. WUR |
| 110 | Coverage area |
| 112, 114, 116, 118 | Wireless device |
| 120 | External system |
| 202 to 212 | Phases of flow graph in FIG. 2 |
| 302 to 306 | Phases of flow graph in FIG. 3 |
| 402 to 410, 414 | Phases of sequence in FIG. 4 |
| 412 | Access Slot of the sequence in FIG. 4 |
| 502 | WUF in FIGS. 5 to 8 |
| 504 | Access slot in FIGS. 5 and 6 |
| 506 | Reception time in FIGS. 5 to 8 |
| 508 | Intermediate time period in FIGS. 5 to 7 |
| 510 | RAW in FIGS. 5 and 6 |
| 702 | Information for determining an access slot in FIG. 7 |
| 704 | Access slot in FIG. 7 |
| 706 | TXOP in FIG. 7 |
| 710 | RAW in FIG. 7 |
| 804 | Information indicating reservation of the access slots in FIG. 8 |
| 806 | Access slot in FIG. 8 |
| 808 | RAW start time in FIG. 8 |
| 810 | RAW in FIG. 8 |
| 900 to 940 | Structure of the apparatus of FIG. 9 |

The invention claimed is:
1. A method, comprising:
receiving, by an apparatus for a wireless device, a first frame on a first radio interface of the apparatus, wherein the first frame comprises at least one time related parameter for determining an access slot for communications on the first radio interface;

transitioning, by the apparatus after receiving the first frame on the first radio interface, to a first operation mode, where the first radio interface is disabled and a second radio interface of the apparatus is enabled;

receiving, by the apparatus, a second frame on the second radio interface;

determining, by the apparatus, an access slot on the first radio interface, based on the at least one time related parameter of the first frame and on a reception time of the second frame, wherein the first frame causes reservation of the access slot on the first radio interface, said access slot comprising an access slot positioned after transmission of the second frame on the second radio interface;

transitioning, by the apparatus in response to receiving the second frame, to a second operation mode, where the first radio interface is enabled; and transmitting, by the apparatus, a third frame on the first radio interface in the determined access slot.

2. The method according to claim 1, wherein the first radio interface employs a first radio access technology and the second radio interface employs a second radio access technology that is different from the first radio access technology.

3. The method according to claim 2, wherein the first radio access technology is based on a wireless local area network technology, and the second radio access technology is a wakeup radio technology.

4. The method according to claim 1, wherein the first frame is an association response frame from an access node of a wireless network, or the first frame is a response frame to a request by the apparatus to switch from the second operation mode to the first operation mode.

5. An apparatus for a wireless device, the apparatus comprising:
at least one processor, is configured to execute computer program code at the apparatus to:
receive a first frame on a first radio interface, wherein the first frame comprises at least one time related parameter for determining an access slot for communications on the first radio interface;
transition to a first operation mode, where the first radio interface is disabled and a second radio interface is enabled;
receive a second frame on the second radio interface;
determine an access slot on the first radio interface, based on the at least one time related parameter of the first frame and on a reception time of the second frame,
wherein the first frame causes reservation of the access slot on the first radio interface, said access slot comprising an access slot positioned after transmission of the second frame on the second radio interface; and
transition to a second operation mode, where the first radio interface is enabled; transmit a third frame on the first radio interface in the determined access slot.

6. The apparatus according to claim 5, wherein the first radio interface employs a first radio access technology and the second radio interface employs a second radio access technology that is different from the first radio access technology.

7. The apparatus according to claim 6, wherein the first radio access technology is based on a wireless local area network technology, and the second radio access technology is a wakeup radio technology.

8. The apparatus according to claim 5, wherein the first frame includes information indicating assignment of the access slot to the apparatus.

9. The apparatus according to claim 5, wherein the second frame is a multicast wakeup frame or a broadcast wakeup frame capable of triggering determination of at least one other access slot assigned to at least one other apparatus.

10. The apparatus according to claim 5, wherein the first frame is an association response frame from an access node of a wireless network, or the first frame is a response frame to a request by the apparatus to switch from the second operation mode to the first operation mode.

11. The apparatus according to claim 5, wherein the apparatus is a wireless device for accessing a wireless network.

12. An apparatus for an access node of a wireless network, the apparatus comprising:
at least one processor
wherein the at least one processor is configured to execute computer program code at the apparatus to:
transmit a plurality of first frames to a plurality of apparatuses on a first radio interface, each of said first frames comprising at least one time related parameter for determining an access slot for the corresponding apparatus of the plurality of apparatuses for communications on the first radio interface,
wherein the first frames cause reservation of the access slot on the first radio interface, said access slot comprising an access slot positioned after transmission of the second frame on the second radio interface;
transmit a second frame on a second radio interface to the plurality of apparatuses in a first operation mode,
wherein in the first operation mode first radio interfaces of the plurality of apparatuses are disabled and second radio interfaces of the plurality of apparatuses are enabled, for transitioning the plurality of apparatuses to a second operation mode,
wherein in the second operation mode the first radio interfaces of the plurality of apparatuses are enabled; and
receive, in response to transmitting the second frame, third frames from the plurality of apparatuses on the first radio interface, in access slots determined on the basis of the time related parameters of the first frames and a transmission time of the second frame.

13. The apparatus according to claim 12, wherein the first radio interface employs a first radio access technology and the second radio interface employs a second radio access technology that is different from the first radio access technology.

14. The apparatus according to claim 13, wherein the first radio access technology is based on a wireless local area network technology, and the second radio access technology is a wakeup radio technology.

15. The apparatus according to claim 12, wherein the second frame is a multicast wakeup frame or a broadcast wakeup frame capable of triggering determination of access slots assigned to the plurality of apparatuses.

16. The apparatus according to claim 12, wherein the first frames comprise one or more association response frames or one or more response frames to requests from the plurality of apparatuses to switch from a second operation mode to a first operation mode.

* * * * *